J. A. J. & J. E. LINDBECK.
Butter-Workers.

No. 158,097. Patented Dec. 22, 1874.

WITNESSES:
C. Neveux
A. F. Terry

INVENTOR:
Jonas Lindbeck
Andrew J. Lindbeck
John E. Lindbeck
BY Munn & Co
ATTORNEYS.

UNITED STATES PATENT OFFICE.

JONAS LINDBECK, ANDREW J. LINDBECK, AND JOHN E. LINDBECK, OF BISHOP HILL, ILLINOIS, ASSIGNORS TO THEMSELVES AND ANDREW JACOBSON, OF SAME PLACE.

IMPROVEMENT IN BUTTER-WORKERS.

Specification forming part of Letters Patent No. 158,097, dated December 22, 1874; application filed August 15, 1874.

*To all whom it may concern:*

Figure 1:
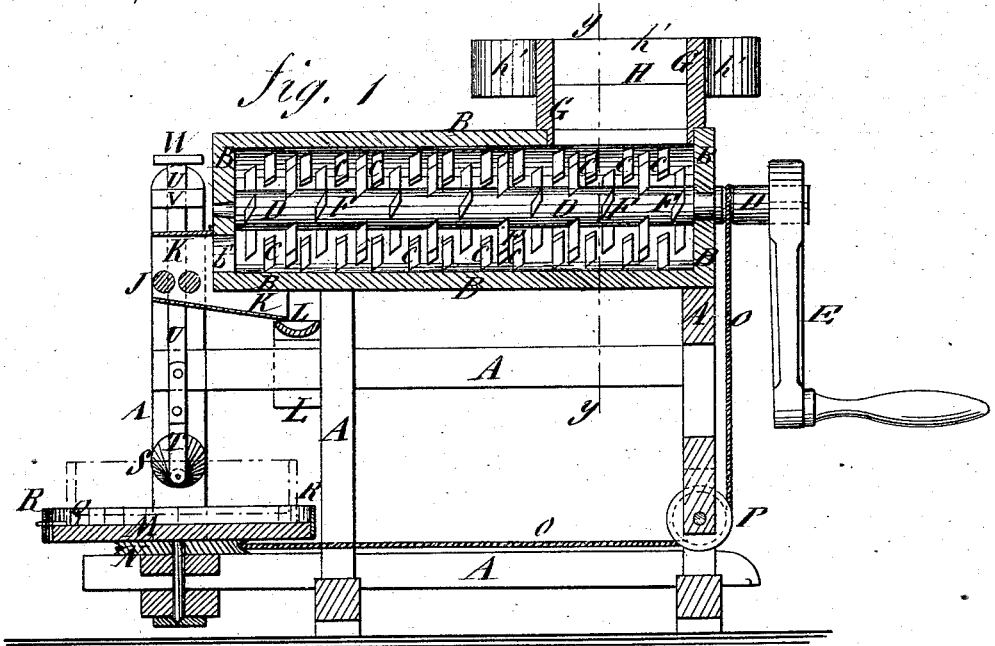
Figure 2:
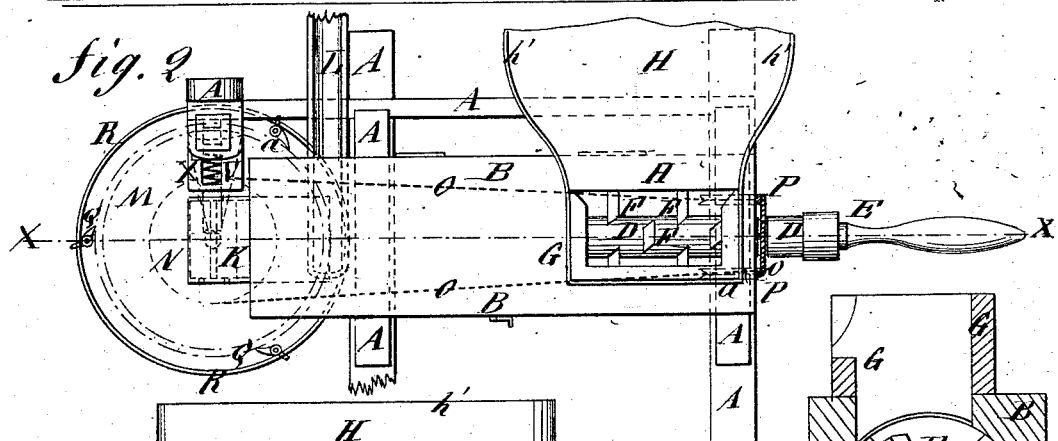
Figure 3:
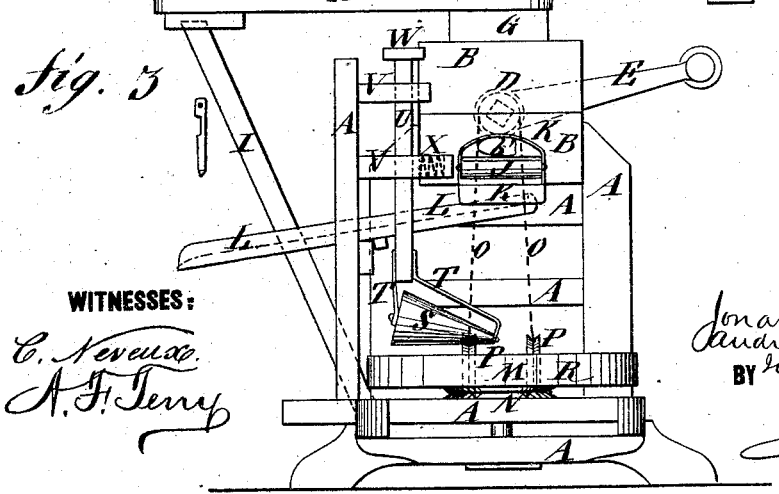
Figure 4:
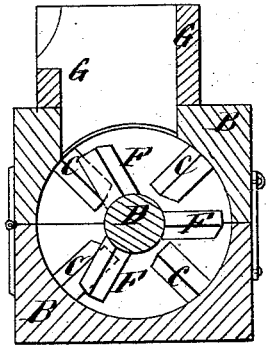

Be it known that we, JONAS LINDBECK, ANDREW J. LINDBECK, and JOHN E. LINDBECK, of Bishop Hill, in the county of Henry and State of Illinois, have invented a new and useful Improvement in Butter-Machine, of which the following is a specification:

Figure 1 is a vertical longitudinal section of our improved machine, taken through the line $x\ x$, Fig. 2. Fig. 2 is a top view of the same. Fig. 3 is a front view of the same. Fig. 4 is a detail cross-section of the same, taken through the line $y\ y$, Fig. 1.

Similar letters of reference indicate corresponding parts.

Our invention has for its object to furnish an improved machine for working, mixing, and packing butter, which shall be simple in construction, convenient in use, and effective in operation, working the butter thoroughly, mixing it evenly, and packing it closely.

The invention consists in the combination, construction, and arrangement of parts, as hereinafter described and specifically claimed.

A is the frame of the machine, to the top of which is attached a box or cylinder, B. The cylinder B is made in two parts hinged to each other at one edge, and secured at the other edge when closed by hooks or other convenient fastenings. To the inner surface of the box B are secured four, more or less, rows of teeth, C, which are made diamond-shaped in their cross-section, and are placed in an inclined position. D is a shaft, the journals of which revolve in bearings in the ends of the box B; and to the projecting end of one of said journals is attached the crank E, by which the machine is operated. To the shaft D are attached teeth, F, which are made diamond-shaped in their cross-section, being similar to the teeth C. The teeth F are inclined in the opposite direction from the teeth C, and are arranged spirally upon the shaft D. In the top of the box B, at its crank end, is formed an opening, in which is placed a hopper, G, for the convenient insertion of the butter. With the hopper G is connected the inner edge of the table H, upon which the butter is placed, and from which it is fed into the hopper G. The table H is provided with an upwardly-projecting rim or flange, $h'$, to prevent the butter from falling off, and its outer end is supported by a leg, I, the upper end of which rests in a notch in a cleat attached to the outer part of the bottom of said table, and its lower end rests upon a sill of the frame A. As the butter is fed into the hopper G it is thoroughly worked and mixed by the teeth C F, and at the same time carried forward to the other end of the box B, and is forced out through a hole, $b'$, in said end. As the butter escapes from the hole $b'$, it passes over two or more rollers, J, pivoted to the sides of a chamber, K, attached to the end of the box B, and the lower side of which inclines back, and projects beneath the end of the box B, to serve as a spout to conduct the brine into a spout, L, attached to the frame A, and by which the said brine is conducted into a vessel placed to receive it. As the butter passes off the rollers J it falls into a tub or firkin placed upon the turn-table M, which is pivoted to the frame A. To the bottom of the turn-table M is attached a pulley, N, around which passes a band, O, which passes around guide-pulleys P pivoted to the frame A, and around the journal of the shaft D, or a pulley attached to said journal, so that the turn-table may be revolved by the revolution of the shaft D. To the upper side of the turn-table M, near its edge, are pivoted three pawls, Q, at equal distances from each other. The outer ends of the pawls Q are inserted in holes in a hoop or band, R, placed around the turn-table M, so that by moving the said band R the pawls Q may be operated to grasp, center, and hold the tub or firkin that receives the butter, and to release said tub or firkin, when desired. The butter as it falls into the tub or firkin is packed by a conical roller, S, which is placed radial with respect to the turn-table M, and is made of such a taper that it will roll around in the tub or firkin without sliding. The conical roller S is pivoted to bars or a bracket, T, attached to the lower end of an upright, U, which passes up through guide-bars V attached to the frame A, and to its upper end is attached a cap-plate or table, W, to receive weights, so that the roller S may be held down upon the butter with any desired pressure. The upright U passes through a slot in the lower guide-bar V, and is held out by a coiled spring, X, placed in the inner side of said slot. The spring X enables the pressing device to adjust itself to the size of the tub or firkin in which the butter is to be packed.

Having thus described our invention, we claim as new and desire to secure by Letters Patent—

1. In a butter-worker, the cylinder B, provided with the hopper G and outlet $b'$, arranged diagonally opposite each other, the shaft D, and teeth C and F, said horizontal lines of teeth being oppositely beveled and arranged, as shown and specified.

2. The rollers J and spout K, in combination with the cylinder B, having the orifice $b'$ and the device for forcing or ejecting the butter therethrough, as shown and described, for the purpose specified.

JONAS LINDBECK.
ANDREW J. LINDBECK.
JOHN E. LINDBECK.

Witnesses:
JOHN A. NELSON,
ANDREW AMQUIST.